Oct. 27, 1964
H. T. EDGAR
3,153,953
PRECISION INDEXING DEVICE
Filed April 6, 1962
5 Sheets-Sheet 1
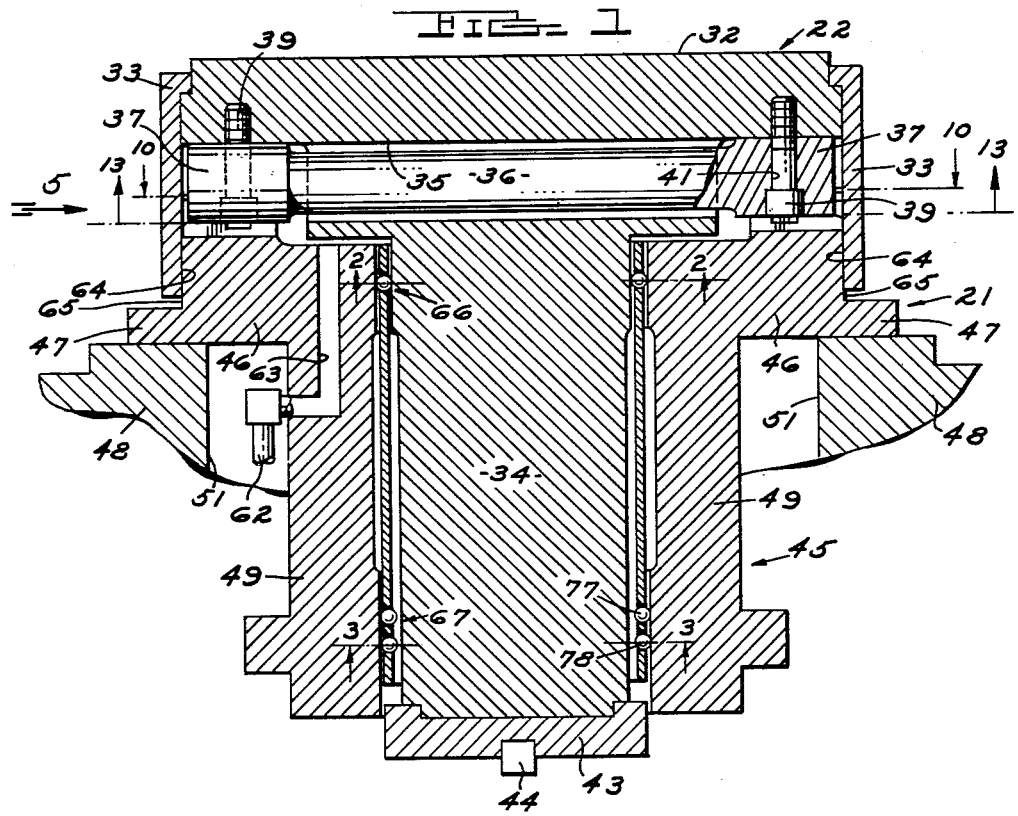
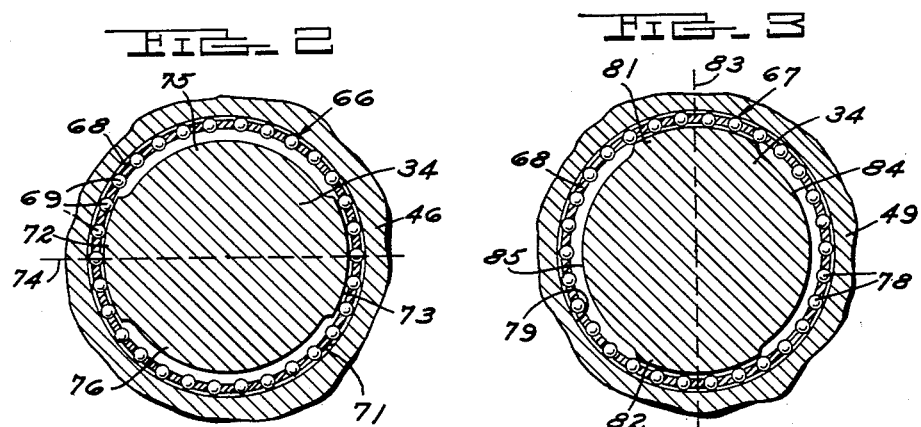
INVENTOR.
HUGH T. EDGAR
BY
Harness, Dickey & Pierce
ATTORNEYS Oct. 27, 1964 H. T. EDGAR 3,153,953
PRECISION INDEXING DEVICE
Filed April 6, 1962 5 Sheets-Sheet 2
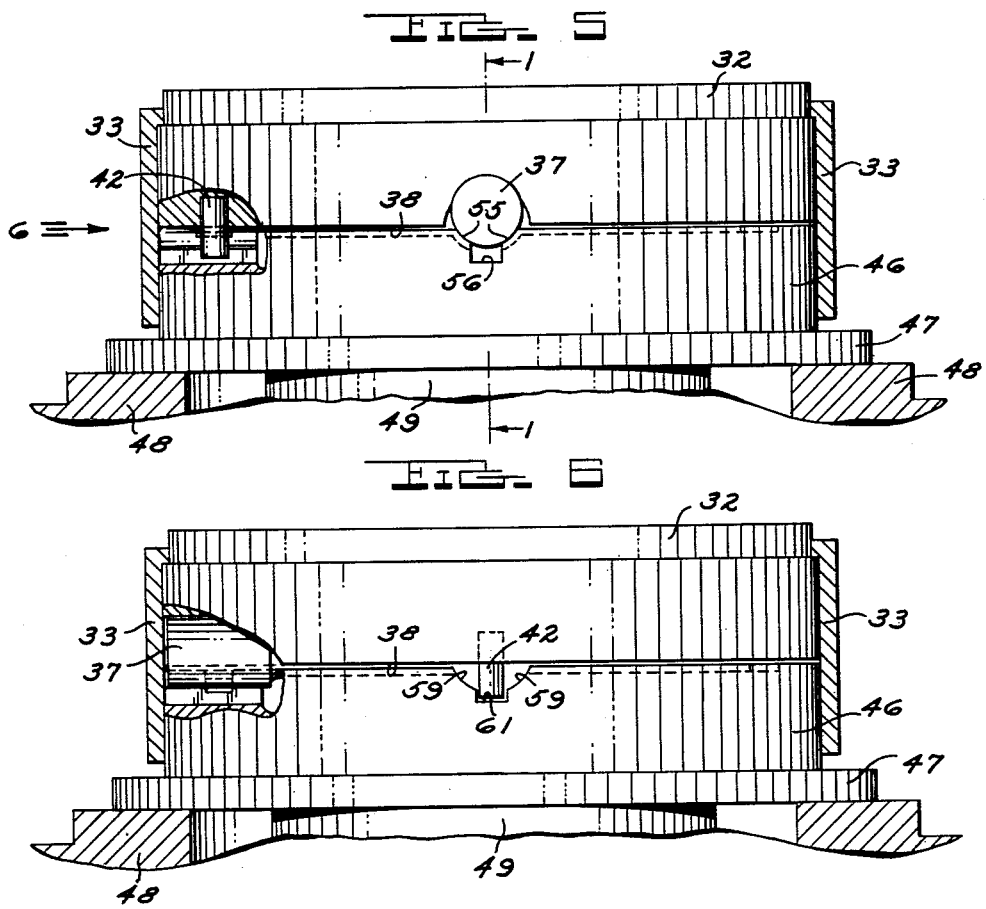
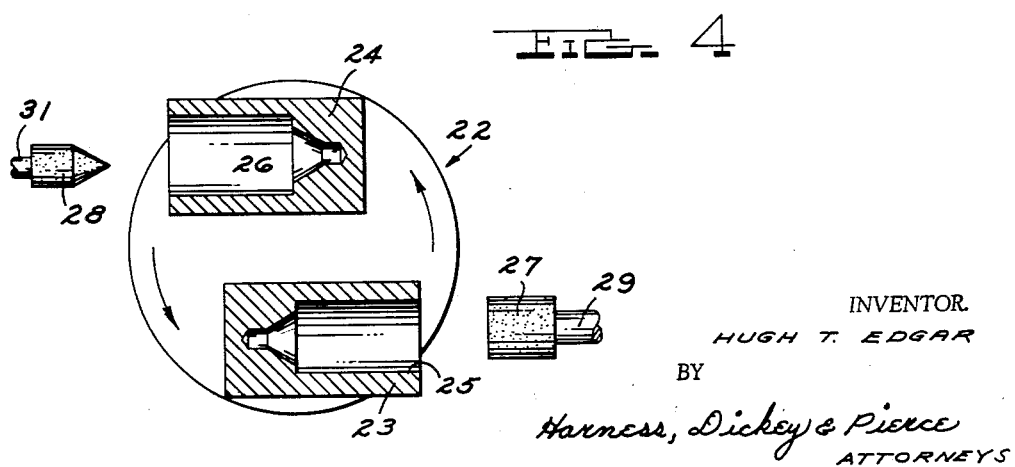
INVENTOR.
HUGH T. EDGAR
BY
Harness, Dickey & Pierce
ATTORNEYS

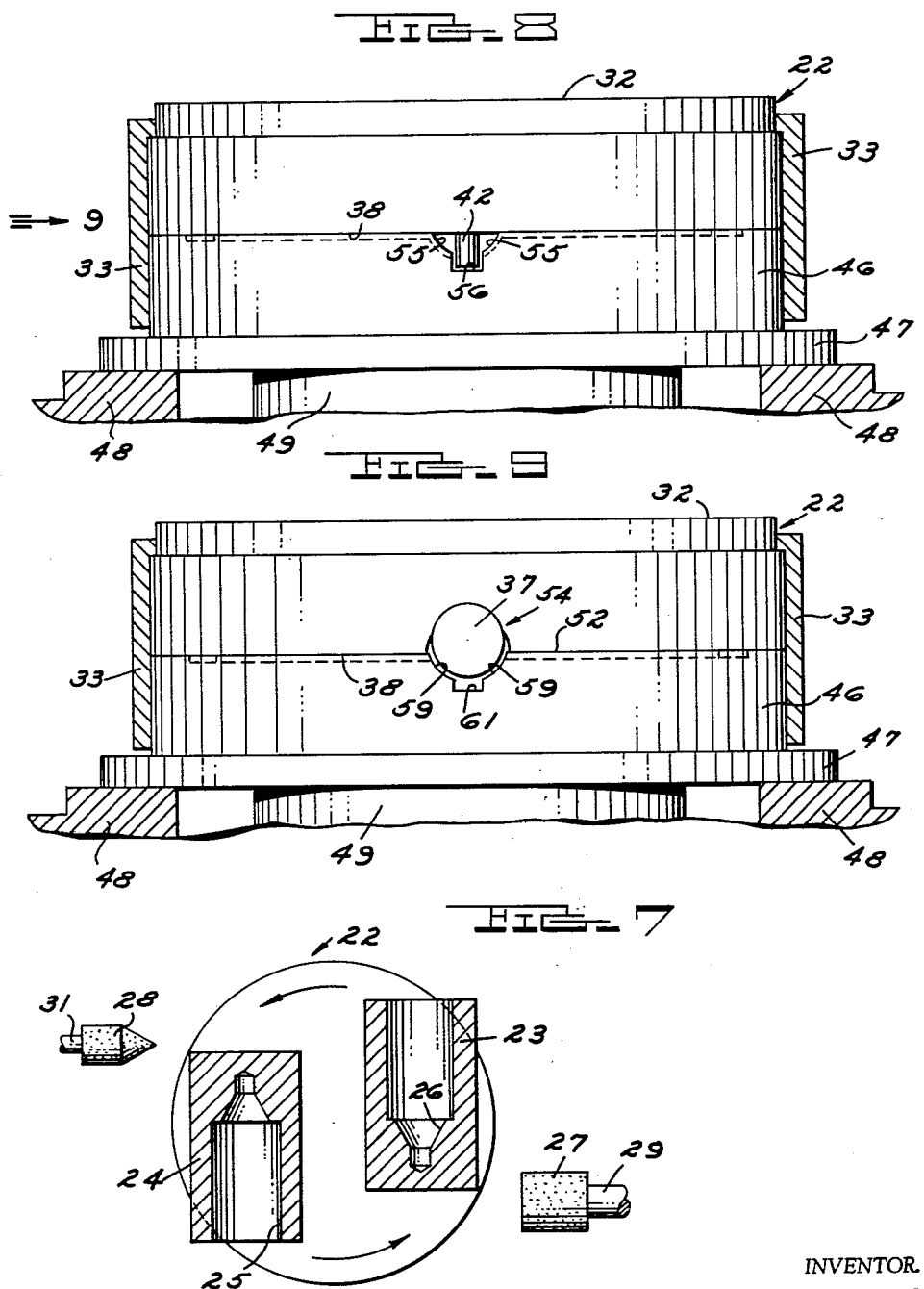

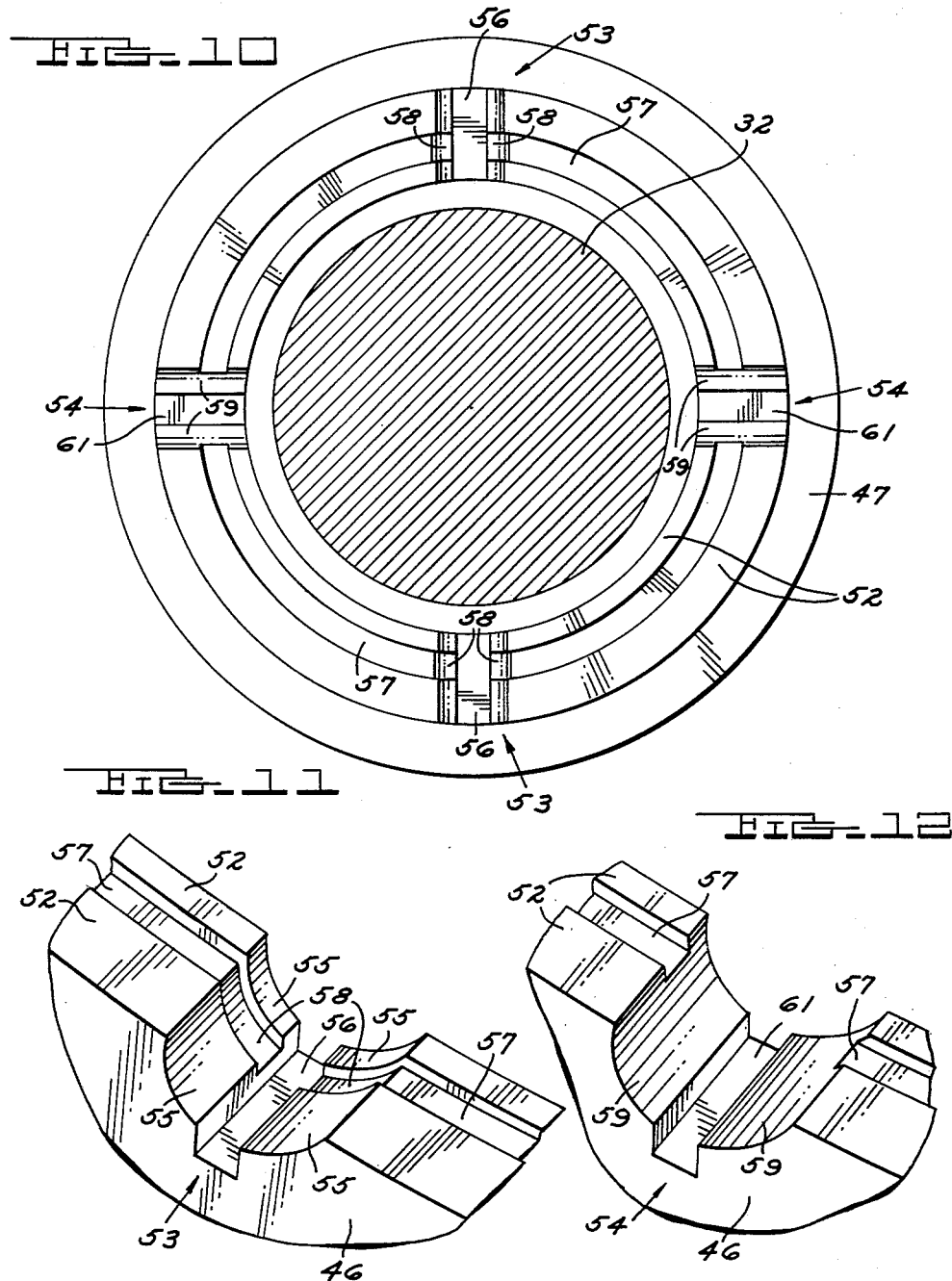

Oct. 27, 1964    H. T. EDGAR    3,153,953
PRECISION INDEXING DEVICE
Filed April 6, 1962    5 Sheets-Sheet 5
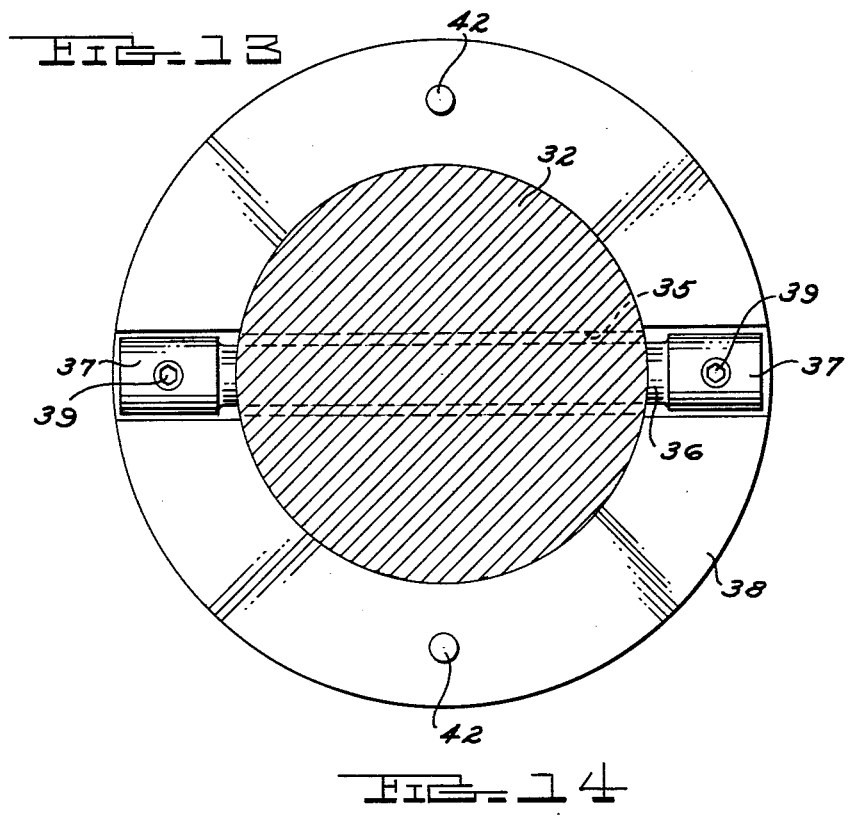
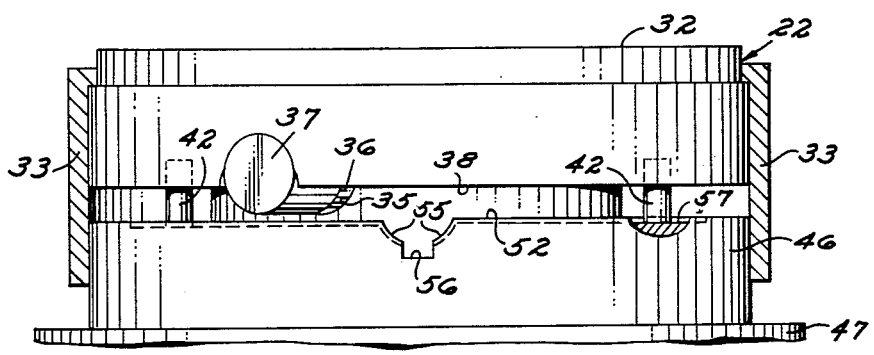
INVENTOR.
HUGH T. EDGAR
BY
Harness, Dickey & Pierce
ATTORNEYS United States Patent Office 3,153,953
Patented Oct. 27, 1964

3,153,953
PRECISION INDEXING DEVICE
Hugh T. Edgar, Charlestown, N.H., assignor to Bryant Chucking Grinder Company, Springfield, Vt., a corporation of Vermont
Filed Apr. 6, 1962, Ser. No. 185,660
9 Claims. (Cl. 74—826)

This invention relates to precision indexing devices, and more particularly to means for supporting workpieces in such manner that they may be accurately located with respect to tools which are to successively engage each workpiece.

It is an object of the invention to provide an improved precision indexing device which is adapted repeatedly to position successive workpieces mounted on the device in a plurality of angularly spaced positions, and which insures accuracy of movement of the indexing components.

It is another object to provide an improved precision indexing device of this character which may be readily moved between its positions, is of simple and reliable construction, and is adapted to prevent inadvertent marring of the locating surfaces.

It is also an object of the invention to provide an improved precision indexing device of this nature which insures proper and full engagement of the mating locating surfaces.

It is a further object to provide an improved precision indexing device having the above characteristics, which includes a flat surface for supporting the parts to be indexed, and which insures mutual perpendicularity between this surface and the indexing axis regardless of the angular position of the table about this axis.

It is another object to provide an improved precision indexing device of this character which is adapted to have one or more non-precision locations as well as a plurality of precision locations.

It is a further object of the invention to provide an improved precision indexing device having the above characteristics, which is especially adapted to have precision indexing locations spaced 180° apart.

Other objects, features and advantages of the present invention will become apparent from the subsequent description, taken in conjunction with the accompanying drawings, in which:

FIGURE 1 is a cross-sectional view in elevation of a suitable embodiment of the precision indexing device showing the aligning bar disposed within the precision locating bearings;

FIGURE 2 is a fragmentary cross-sectional view taken along the line 2—2 of FIGURE 1, and showing the upper table guide bearing construction which prevents table displacement parallel to the aligning bar axis;

FIGURE 3 is a fragmentary cross-sectional view taken along the line 3—3 of FIGURE 1 and showing the lower table guide bearing construction which prevents shifting of the table about the aligning bar axis;

FIGURE 4 is a diagrammatic plan view of the table shown in its precision locating position with two workpieces mounted thereon and two grinding wheels adapted to grind internal surfaces of the workpieces;

FIGURE 5 is a fragmentary side elevational view taken in the direction of arrow 5 of FIGURE 1 and showing the engagement of the aligning bar in the precision locating bearings, a portion of the view being sectioned to show the disposition of a guard projection within a non-precision clearance recess;

FIGURE 6 is an elevational view taken in the direction of the arrow 6 of FIGURE 5, parts being sectioned to show the engagement of one end of the aligning bar in its precision locating bearing;

FIGURE 7 is a view similar to FIGURE 4 but showing the table indexed 90° to a non-precision location for unloading and loading;

FIGURE 8 is a fragmentary side elevational view similar to FIGURE 5 but with the table in its non-precision location, parts being broken away to show the disposition of a guard projection in a precision locating bearing;

FIGURE 9 is a fragmentary side elevational view taken in the direction of arrow 9 of FIGURE 8, parts being broken away to show the location of one end of the aligning bar in a non-precision clearance recess;

FIGURE 10 is a cross-sectional plan view taken in the direction of arrows 10—10 of FIGURE 1, the cover ring being removed and showing the construction of the housing surface which faces the aligning bar;

FIGURE 11 is a fragmentary perspective view of a portion of the housing showing the configuration of a precision locating bearing and the adjacent portion of the guard projection slot;

FIGURE 12 is a fragmentary perspective view showing the configuration of a non-provision clearance recess together with the adjacent portion of the guard projection slot;

FIGURE 13 is a cross-sectional view taken in the direction of the arrows 13—13 of FIGURE 1, the cover ring being removed, and showing the configuration of the aligning bar, and FIGURE 14 is a view similar to FIGURES 5 and 8 and showing the table in an intermediate angular position but dropped so that the guard projections engage the bottom of the guard projection slot, thus illustrating the manner in which the locating surfaces of the aligning bar will be protected.

Briefly, the illustrated embodiment of the invention comprises a housing having a central bore within which is disposed the generally cylindrical extension of an indexing table adapted to support one or more parts to be indexed, such as a plurality of workpieces having surfaces to be successively ground. An aligning bar is secured to the underside of the table and has two cylindrical precision end surfaces adapted to be received by a pair of concave precision locating bearings in the upper surface of the housing spaced 180° apart. A pair of non-precision clearance recesses are formed in the housing, spaced 90° from the precision locating bearings, for permitting the indexing table to come to rest in an intermediate position in order that parts may be unloaded from and loaded onto the table.

Table guide bearing means are provided between the table extension and the housing for permitting lifting and lowering of the table as well as table rotation. The bearing means are so constructed as to prevent shifting of the table either parallel to or about the aligning bar axis, but permitting such limited movement as is necessary to properly engage the locating surfaces. The bearing means comprises a lower bearing adapted to prevent table rocking about the aligning bar axis, and an upper bearing adapted to prevent shifting of the table in the direction parallel to the aligning bar axis. The lower bearing comprises a pre-loaded ball type anti-friction bearing, but with portions of one race relieved on both sides of a plane containing the table extension and the aligning bar axes. The upper bearing likewise comprises a preloaded ball type of anti-friction bearing, but with one race relieved on both sides of a plane containing the table extension axis and perpendicular to the first-mentioned plane. The bearings insure accurate shifting and indexing of the table while permitting proper engagement of the locating surfaces and maintaining the concentric and planar position of the table at all times.

Referring more particularly to the drawings, the indexing device is generally indicated at 21 in FIGURE 1 and comprises an indexing table generally indicated at 22 and shown schematically in FIGURES 4 and 7. The indexing device is intended to permit precision location of table 22 at two locations spaced 180° apart; one of these locations is shown in FIGURE 4. The device is also intended to permit non-precision locations of table 22 in two positions spaced 180° apart but spaced 90° from the precision locations; a non-precision location of table 22 is shown in FIGURE 7.

One use for indexing device 21 could be for the purpose of grinding a plurality of workpieces, two of which are shown at 23 and 24 in FIGURES 4 and 7. Each workpiece may have a first internal surface 25 and a second internal surface 26 to be successively ground by grinding wheels 27 and 28, respectively. The grinding wheels and their respective spindles 29 and 31 are shown schematically in FIGURES 4 and 7, it being assumed for purposes of explanation that spindles 29 and 31 are capable of axial movement into and out of workpieces 23 and 24, and feeding movement against surfaces 25 and 26, respectively, in directions at right angles to the axes of spindles 29 and 31. These axes are shown as being in parallel relation, with grinding wheels 27 and 28 being movable into the workpieces in opposite directions.

With workpieces 23 and 24 mounted on table 22 180° apart with their bores facing in opposite directions, assume that the position shown in FIGURE 4 is an initial index position. With the workpieces accurately located in this position, tools 27 and 28 may enter the respective workpieces to grind surface 25 of workpiece 23 and surface 26 of workpiece 24. After the tools are withdrawn, table 22 will be rotated counterclockwise approximately 90° to the index position shown in FIGURE 7. When in this position, workpiece 24 may be unloaded and an unfinished workpiece mounted in its place. The table will then be indexed another 90° so that workpiece 23 occupies the position formerly occupied by workpiece 24 in FIGURE 4. This will be a second precision location, and surface 26 of workpiece 23 will be ground, along with surface 25 of the workpiece which replaced workpiece 24. Table 22 will then be indexed another 90° to a second non-precision location, at which point workpiece 23 will be removed. In this manner, a large number of workpieces may be sequentially ground.

Table 22 comprises a flat circular upper surface portion 32 on which is mounted a depending annular cover ring 33. An extension 34 of generally cylindrical shape is integrally formed with surface portion 32 of table 22, as seen in FIGURE 1. Preferably, surface 32 is concentric with respect to extension 34. A transverse bore 35 is formed in table 22 between surface portion 32 and extension 34, the opposite ends of bore 35 being open in a downward direction as seen in FIGURE 1.

An aligning bar 36 is disposed within bore 35, this bar having a relieved central portion and a pair of cylindrically shaped locating surfaces 37 at the opposite ends thereof. The lower portions of surfaces 37 are exposed, as shown in FIGURE 5, and extend below an annular flat surface 38 on the underside of surface portion 32 of table 22. A pair of bolts 39 extend through counterbored apertures 41 in the opposite ends of bar 36 and are threaded into the underside of table portion 32 as seen in FIGURES 1 and 13, thus rigidly securing bar 36 to the table. The length of bar 36 is slightly less than the diameter of table 22, and cover ring 33 extends downwardly past bar 36 as seen in FIGURE 1.

A pair of diametrically opposed guard projections 42 are secured to and extend downwardly from surface 38 of table 22, as seen in FIGURES 13 and 14. These flat-bottomed projections may be fabricated of a rigid plastic material or of a suitable metal, and extend downwardly below the undersides of surfaces 37. The diameter of projections 42 is substantially less than the width of annular surface 38, and the pins are spaced 90° from the ends of the axis of bar 36, although the accuracy of this angular distance is not critical, as will later become evident.

An adaptor 43 is secured to the lower end of extensions 34 and carries a key 44 adapted to cooperate with actuating means (not shown) for lifting, rotating and lowering table 22. This actuating means may take any suitable form and may be hydraulically or electrically operated, but preferably includes means for rotating table 22 in increments of approximately 90°.

A housing generally indicated at 45 supports table 22, as seen in FIGURE 1. Housing 45 has a circular upper portion 46 with a flange 47 resting on a base 48, and a downward extension 49 which surrounds extension 34 of table 22 and is disposed within a clearance aperture 51 in base 48.

Housing portion 46 has an upper flat annular surface 52 as seen in FIGURE 10 facing table undersurface 38. Surface 52 has a first pair of precision locating bearings generally indicated at 53 and a second pair of non-precision or clearance recesses generally indicated at 54. Bearings 53 are spaced apart 180° and recesses 54 are likewise spaced apart 180°, but are spaced 90° from bearings 53, as seen in FIGURE 10.

The construction of each bearing 53 is seen best in FIGURE 11. The bearing comprises a surface 55 having the same radius as surfaces 37. Surface 55 extends entirely across surface 52, and is somewhat less than semi-cylindrical in shape, as seen in FIGURE 5.

A clearance notch 56 is formed in the central portion of surface 55 and extends entirely across this surface, forming an interruption thereof. A guard projection groove 57 of generally annular shape is formed in surface 52, as seen in FIGURE 10, this groove being adapted to receive the lower ends of projections 42. Groove 57 has portions 58 extending along surfaces 55 between surface 52 and notches 56, as seen in FIGURE 11. Groove portions 58 thus likewise form interruptions of surface 55.

Recesses 54 are, like bearings 53, of concave arcuate shape, having a main surface 59 extending across surface 52 of the housing as seen in FIGURE 12. However, recesses 54 are somewhat deeper than bearings 53, so that when they receive ends 37 of bar 36, they will permit head 22 to descend until surface 38 engages surface 52 of housing 45, as seen in FIGURE 9. A clearance notch 61 is formed at the bottom of each recess 54 for receiving a projection 42 when aligning bar 36 is disposed within bearings 53; this position is shown in FIGURE 6. Groove 57 extends to but not within notches 54, as seen in FIGURE 12. This is because it is unnecessary to protect surface 59 from engagement with projections 42 as it is to protect precision locating surface 55.

A connection 62 from a source of low pressure compressed and filtered air (not shown) is disposed within clearance aperture 51 of base 48, as seen in FIGURE 1, and leads to a passageway 63 within housing 45. This passageway is connected to the upper surface of housing 45, so that upon lifting of table 22 the danger of a partial vacuum being created will not occur. This will prevent foreign particles from being drawn into the area of the precision locating surfaces. A slight clearance exists between the inner surface 64 of cover ring 33 and the outer surface 65 of housing portion 46, seen in FIGURE 1. The air which is required to leave the space between table 22 and housing 45 when the table descends may escape through this annular space.

The means for supporting table 22 for axial and rotational movement comprises an upper bearing generally indicated at 66 and a lower bearing generally indicated at 67 in FIGURE 1. Each bearing is of a preloaded ball anti-friction type, with a sleevelike cage 68 being disposed within the annular space existing between table extension 34 and housing extension 49 and supporting the balls of both bearings 66 and 67.

The construction of bearing 66 is best seen in FIGURE 2. The bearing comprises a plurality of circumferentially spaced balls 69 supported by cage 68, and a cylindrical surface 71 within table extension 49 on which balls 69 may roll in any direction. A pair of arcuate surfaces 72 and 73 are formed on extension 34, these surfaces likewise engaging balls 69 and being so spaced from surface 71 that displacement of table 22 is prohibited in a direction parallel to the axis of bar 36; the direction of this axis is indicated in dot-dash lines at 74 in FIGURE 2. Surfaces 72 and 73 are formed on opposite sides of extension 34 and are shown as extending approximately 30° on either side of axis 74. Relieved portions 75 and 76 are formed on extension 34 between surfaces 72 and 73. The upper portion of extension 34 is thus relatively free for limited movement in a direction transverse to axis 74, permitting control of table 22 in this direction by bar 36, but bearing 66 nevertheless prohibits table displacement in a direction parallel to the aligning bar axis.

The construction of bearing 67 is best seen in FIGURE 3, this bearing comprising an upper row of balls 77 and a lower row of balls 78, as seen in FIGURE 1. Each of these rows is of identical construction, and row 78 will be described with respect to FIGURE 3. Both rows of balls 77 and 78 are carried by cage 68, and a cylindrical surface 79 is provided on the inside of the lower portion of housing extension 49, balls 77 and 78 being free to roll on this surface in any direction. A pair of arcuate bearing surfaces 81 and 82 are formed on the lower end of extension 34, and engage balls 77 and 78 in such manner as to prohibit displacement of the extension which would permit rocking of table 22 about the axis of aligning bar 36. Surfaces 81 and 82 are formed on opposite sides of extension 34 and are symmetrically disposed about an axis at right angles to axis 74; this axis is indicated in dot-dash lines at 83 in FIGURE 3. Surfaces 81 and 82 extend about 30° from either side of axis 83, and relieved portions 84 and 85 are formed in extension 34 between surfaces 81 and 82. Bearing 67 will therefore provide limited freedom of movement of the lower end of extension 34 in the direction of axis 74, thus permitting the seating of both ends 37 of bar 36. This movement could be considered rocking movement about an axis in the plane of bearing 66 and perpendicular to the axis of bar 36. However, displacement of the lower end of extension 34 is prohibited in the direction of axis 83, and rocking of the table about the axis of the seated aligning bar is therefore prevented.

In operation, assuming an initial condition in which table 22 is in the position shown in FIGURES 4, 5 and 6, locating surfaces 37 of bar 36 will rest on bearing surfaces 55 of housing 45. The locations of these surfaces are such that surfaces 38 and 52 of the table and housing respectively will be held a slight distance apart. Projections 42 will be disposed within clearance recesses 54, with the lower ends of these projections being spaced slightly above the bottoms of clearance notches 56.

After workpieces 23 and 24 have been ground by wheels 27 and 28, respectively, table 22 will be lifted and rotated counterclockwise to the position shown in FIGURE 7. During the lifting movement, slight air pressure applied through passage 63 to the space between the table and housing, will prevent any vacuum effect from interfering with smooth movement of the table and will prevent foreign particles from being drawn into the area of the precision locating surfaces. Table 22 will be lifted a sufficient distance to allow it to be rotated, with projections 42 spaced slightly above the bottoms of groove 57. The presence of this groove will decrease the necessary lifting distance of table 22.

During lifting and rotational movement, bearing 66 will prevent shifting of the table in the direction of the aligning bar axis, while bearing 67 prevents tilting of the table about the aligning bar axis.

When the position of FIGURES 7, 8 and 9 is reached, table 22 will be lowered with bar ends 37 entering clearance recesses 54 and projections 42 entering bearings 53 until they engage the bottoms of notches 56. The depth of these notches is such that surfaces 38 and 52 of the table and housing will become engaged, but ends 37 of bar 36 will be held in spaced relation with surfaces 59 of recesses 54. A slight clearance may exist between the walls of notches 56 and projections 42, but this clearance is insufficient to permit ends 37 of bar 36 to engage surfaces 59 of recesses 54.

With table 22 in the position of FIGURE 7, workpiece 23 will be in a rest position and workpiece 24 will be in unloading position so that it may be replaced with another workpiece to be ground. Table 22 will then be lifted and again rotated counterclockwise 90°, lowering of table 22 permitting ends 37 of bar 36 to again engage bearing surfaces 55.

During this engaging movement, the clearance provided by recesses 84 and 85 at the lower end of extension 34 will permit freedom for both ends of bar 36 to be seated. The presence of recesses 75 and 76 at the upper end of extension 34 will permit control of table 22 by bar 36 in the direction of axis 83.

Projections 42 and groove 57 provide means for preventing any damage to bar ends 37 or bearing surfaces 55 should table 22 be inadvertently dropped. Should the support for table 22 be withdrawn when the table is in an intermediate rotational position, as seen in FIGURE 14, projections 42 will engage the bottom of groove 57, thus preventing bar ends 37 from hitting surface 52. The presence of portions 58 of groove 57 extending across surfaces 55 will prevent projections 42 from engaging surfaces 55, should table 22 be lowered when it is shifted slightly from the position of FIGURES 7, 8 and 9.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a precision indexing device, an indexing table, a housing, means on said table and housing for rotation of said table relative to said housing about a predetermined axis and for reciprocation of said table in the direction of said axis, and precision locating means comprising an aligning bar secured to said table and facing said housing, said aligning bar having precision locating surfaces at opposite ends thereof, and at least one pair of spaced and diametrically opposed bearing surfaces on said housing facing said aligning bar and adapted to simultaneously coact with said aligning bar surfaces to positively locate said table in a predetermined angular position.

2. The combination according to claim 1, said aligning bar end surfaces being of identical cylindrical shape, said housing bearing surfaces being of concave partially cylindrical shape.

3. The combination according to claim 2, said housing being further provided with a pair of diametrically opposed clearance recesses spaced angularly from said bearing surfaces and adapted to receive said aligning bar end surfaces, a pair of diametrically opposed guard projections extending from said table and adapted to enter said concave bearing surfaces when said aligning bar ends are aligned with said clearance recesses, clearance notches formed in the bottoms of said concave bearing surfaces for receiving said projections, and mutually engageable surfaces on said indexing table and housing for preventing engagement of said aligning bar end surfaces with the surfaces of said clearance recesses.

4. In a precision indexing device, an indexing table of generally circular shape having a flat surface, a central extension integrally formed with and on one side of said table, a transverse bore spaced from and parallel to the table surface, an aligning bar disposed within said bore, the aligning bar having a length only slightly less than the diameter of said table, means securing said aligning bar to said table, the central portion of said aligning bar being of reduced diameter, the outer ends of the aligning bar having identical cylindrical precision locating surfaces exposed in a direction away from said table surface, a housing having an annular surface facing said aligning bar end surfaces, a pair of recessed bearing surfaces formed in said housing surface and adapted to coact with said aligning bar locating surfaces to positively locate said table in a predetermined angular position, and bearing means interposed between said housing and said table extension for rotational movement about the extension axis and linear table movement in the direction of said axis.

5. The combination according to claim 4, said bearing means comprising a first bearing adjacent the end of said extension closer to said table surface, said first bearing including means for preventing movement of said table in the direction of the aligning bar axis but for permitting limited movement of the table in a direction perpendicular to the aligning bar axis and parallel to the table surface, and a second bearing adjacent the end of said extension remote from said table surface, said second bearing including means for preventing rocking of the table about the aligning bar axis but for permitting limited rocking movement of said lower extension end about an axis in the plane of said first bearing and perpendicular to the aligning bar axis.

6. The combination according to claim 4, said table being further provided with a cover ring secured to the outer edge thereof and extending toward said housing, and an outwardly facing annular surface on said housing, said cover ring overlapping said last-mentioned surface and enclosing said aligning bar and bearing surfaces.

7. The combination according to claim 6, further provided with means for conducting low pressure compressed air to the space between said table and housing, said cover ring being slightly spaced from said annular housing surface to permit escape of said air.

8. In a precision indexing device, a table member, a housing member, guide bearing means for permitting relative axial and rotational movement between said members with respect to a predetermined axis, a pair of precision locating surfaces on one of said members, said surfaces comprising convex surfaces of revolution having a common axis, and a pair of precision bearing surfaces on the other member for simultaneously receiving said loacting surfaces, each pair of surfaces being symmetrical about a plane perpendicular to said common axis and containing said predetermined axis, said guide bearing means including a first bearing having means for preventing relative shifting of said members in a direction parallel to said common axis but permitting limited relative shifting of said members in a direction perpendicular to said common axis and said predetermined axis, and a second bearing spaced axially from said first bearing and having means for preventing relative rocking of said members about said common axis but for permitting limited relative rocking movement about an axis in the plane of said first bearing and perpendicular to said common axis.

9. The combination according to claim 8, said first bearing comprising a plurality of circumferentially spaced balls between said housing and table members, an annular cylindrical surface on said housing member engageable by said balls, a pair of oppositely disposed partially cylindrical surfaces on said table member symmetrical about a plane passing through said common axis, relieved portions on said table member between said oppositely disposed surfaces, said second bearing comprising a plurality of circumferentially spaced balls between said housing and table members, a cylindrical surface on said housing member engageable by said last-mentioned balls, a pair of oppositely disposed partially cylindrical surfaces on said table member symmetrical about a plane perpendicular to said last-mentioned plane, and a pair of relieved portions on said table member between said last-mentioned surfaces.

References Cited in the file of this patent

UNITED STATES PATENTS

| | | |
|---|---|---|
| 1,368,119 | Crockcroft | Feb. 8, 1921 |
| 2,810,306 | Romi | Oct. 22, 1957 |
| 2,975,657 | Samuel | Mar. 21, 1961 |